United States Patent
Menegoli et al.

(10) Patent No.: US 8,786,269 B2
(45) Date of Patent: Jul. 22, 2014

(54) CONSTANT FREQUENCY SYNTHETIC RIPPLE POWER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 332 days.

(21) Appl. No.: 13/136,733

(22) Filed: Aug. 10, 2011

(65) Prior Publication Data
US 2013/0038310 A1 Feb. 14, 2013

(51) Int. Cl.
*G05F 1/00* (2006.01)
*H02M 3/156* (2006.01)
*H02M 1/00* (2006.01)

(52) U.S. Cl.
CPC ...... *H02M 3/156* (2013.01); *H02M 2001/0025* (2013.01)
USPC ............................ 323/288; 323/282

(58) Field of Classification Search
USPC .......... 323/242, 243, 271, 282, 284, 285, 288
See application file for complete search history.

(56) References Cited

U.S. PATENT DOCUMENTS

| | | | |
|---|---|---|---|
| 6,495,995 B2 | 12/2002 | Groom et al. | |
| 6,813,173 B2 * | 11/2004 | Lipcsei | 363/98 |
| 7,019,504 B2 | 3/2006 | Pullen et al. | |
| 7,202,642 B1 | 4/2007 | Chen et al. | |
| 7,304,464 B2 * | 12/2007 | Weng et al. | 323/285 |
| 7,482,793 B2 * | 1/2009 | Stoichita | 323/282 |
| 7,609,042 B2 * | 10/2009 | Kokubun et al. | 323/284 |
| 7,764,057 B2 | 7/2010 | Groom | |
| 7,923,977 B2 * | 4/2011 | Huang | 323/271 |
| 7,932,703 B2 * | 4/2011 | Brohlin et al. | 323/222 |
| 7,969,134 B2 * | 6/2011 | Chen | 323/285 |
| 8,159,204 B2 * | 4/2012 | Grant | 323/285 |
| 8,541,993 B2 * | 9/2013 | Notman et al. | 323/271 |
| 2009/0174380 A1 | 7/2009 | Wu et al. | |
| 2012/0049829 A1 * | 3/2012 | Murakami | 323/288 |
| 2012/0268095 A1 * | 10/2012 | Wu | 323/285 |

* cited by examiner

*Primary Examiner* — Gary L Laxton
*Assistant Examiner* — Afework Demisse

(57) ABSTRACT

A novel method to operate synthetic ripple switching power converters at constant frequency is presented. The method includes the generation of a clock signal and the summing of a ramp signal to a DC voltage reference to be compared to a synthetic ripple signal. The ramp signal is synchronous with the clock signal. A minimum on-time or minimum off-time type of control is implemented. The switching frequency is constant.

The presented approach provides significant advantages with respect to the more traditional means of utilizing hysteretic approaches combined with frequency control circuits.

The switching frequency can be as high as the one obtained for a hysteretic power converter, the load and line transient response is comparable with or better than the one achieved with hysteretic approaches. The stability is obtained by adapting the slope of the ramp signal in order to obtain the adequate gain of the system.

The method is presented for buck and boost hysteretic high frequency switching power converters, but can be utilized also for buck-boost converters. The general method can be utilized also for multiphase switching power converters.

A non clocked variant of the novel circuit topology is also presented to improve load and line transient performance.

20 Claims, 12 Drawing Sheets

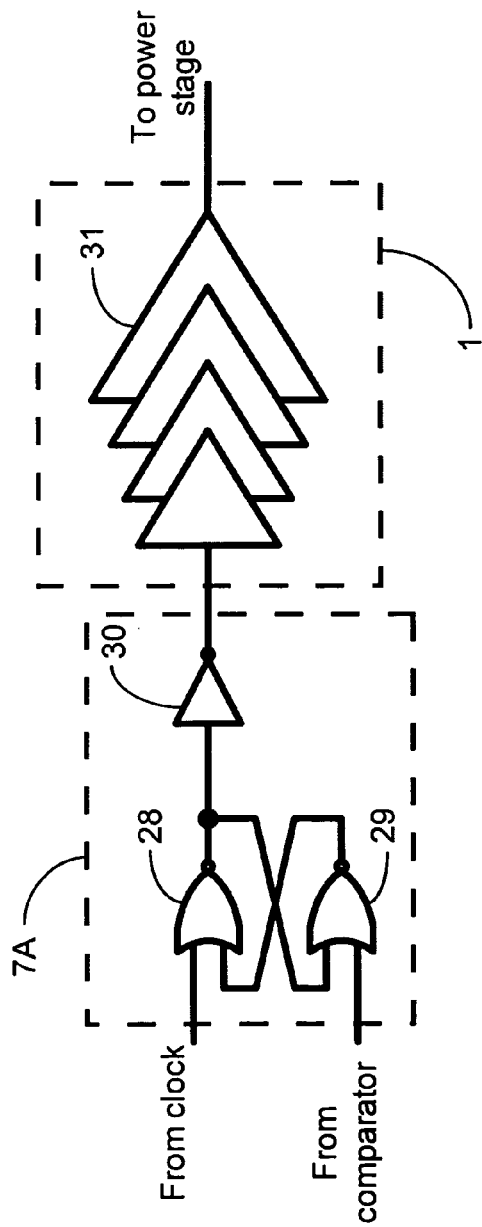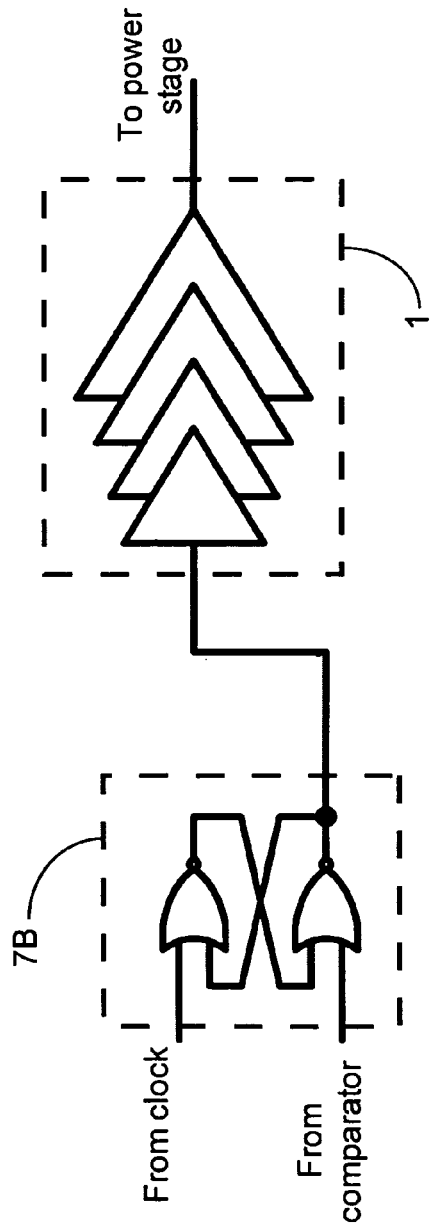
FIG.9A
FIG.9B

CONSTANT FREQUENCY SYNTHETIC RIPPLE POWER CONVERTER

BACKGROUND OF THE INVENTION

1. Field of the Invention

The present invention is in the field of power converters. The present invention is further in the field of semiconductor switching power converters. The present invention further relates to the field of integrated synthetic ripple control methods for switching power converters and circuits. The present invention is further in the field of integrated switching power converters. The present invention is further in the field of minimum on- and off-time control types for switching power converters. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. Switching power converters comprise isolated and non isolated topologies. The galvanic isolation is generally provided by the utilization of transformers. Although the subject invention is mainly focused on non isolated switching power converters, it refers both to isolated and non isolated power converters.

Modern switching power converters are in general divided in step down power converters, also commonly known as "buck converters", and step up power converters commonly known as "boost converters". This definition stems from the ability of the converter to generate regulated output voltages that are lower or higher than the input voltage regardless of the load applied.

One class of modern switching power converters implemented in integrated circuits is the one comprising hysteretic control or pseudo-hysteretic control where a synthetic ripple signal is generated and compared to a reference to determine the duty cycle of the switching period in order to regulate the output voltage at the desired level. These hysteretic power converters do not include an error amplifier, a specific compensation network or a periodic signal to determine the switching frequency.

In fact their switching frequency is determined by several factors like the input voltage, the output voltage, the toad, the output capacitor value, the inductor value, the hysteresis value, and the general propagation delays of the feedback network, of the comparator, of the driver, and of the output stage. Therefore, if left uncontrolled, the switching frequency of these power converters varies depending on the conditions of the converter.

However, typically, it is desirable to have constant switching frequency in continuous conduction mode for several reasons, but mainly to contain the harmonic content of the output stage switching and eventually to allow the filtering of electro-magnetic interference generated by the fast slew rate of the output nodes of the converter.

Although the imposition of a constant switching frequency somewhat alters the frequency response of the power converters and complicates the analysis and study of the stability of the regulator in presence of line and load transients, the switching frequency in hysteretic power converters is generally regulated and maintained constant by means of Phase Lock Loop (PLL), Frequency Lock Loop (FLL) or Delay Lock Loop (DLL) circuits. These circuits effectively modulate a loop parameter to regulate the switching frequency to be the same as the frequency of a provided clock signal.

FIG. 1 depicts a typical prior art block diagram of a hysteretic buck converter with switching frequency control. The oscillator 5 generates a clock signal operating at the desired frequency. The PLL block 4 compares the clock signal with the drive signal coming from the comparator and generates a voltage proportional to the error signal. The output of the PLL 4 is fed into a hysteresis control block 3 that modulates the hysteresis of the comparator 2 in order to regulate the switching frequency of the power converter to be the same as the one of the clock signal generated by the oscillator 5.

These frequency control circuits are clearly operating in closed loop and as such need to be frequency compensated to be locking as quickly as possible and be stable in all conditions. These requirements are often not trivial and the common outcome is that a PLL circuit typically requires several clock cycles to lock to a desired frequency. Furthermore these circuits are often affected by noise and present jitter or phase noise of the switching. A typical PLL requires a phase detector, a filter and a VCO (Voltage Controlled Oscillator).

In hysteretic power converters one of the most challenging transitions occurs when the load is abruptly switched on from a very light load to a heavy load condition. In this case the power converter should provide a relatively stable output voltage with minimum undershoot and a fast transition from DCM (Discontinuous Conduction Mode) to CCM (Continuous Conduction Mode) where the term Discontinuous or Continuous refers to the inductor current. When the load is very low the inductor current tends to reach the zero value within the switching period, while, when the load is high enough, the inductor current remains positive during the whole period.

In order to maintain high efficiency throughout all the load conditions, in DCM, the power converter needs to lower its switching frequency and to reduce, as much as possible, the current consumption of the integrated circuit. This reduction of power consumption is obtained by turning off various portions of the circuit and by slowing down (lowering the bias) the sections of the power converter that are required to continue functioning. The power converter does not need to regulate its switching frequency in DCM and it can operate in PFM (Pulse Frequency Modulation), therefore the frequency synchronization circuit is either turned off or significantly de-biased.

However when the transition to CCM is required, the frequency control circuit needs to turn on and possibly to lock to the desired switching frequency as quickly as possible in order to avoid uncontrolled switching and high magnitude EMI generation outside of the known controlled spectrum.

In the field of switching power converters, and in particular in the field of ripple regulators, it has been proposed the combined use of a minimum on-time approach with synthetic ripple signal generation. A prior art describing this approach is found in Wu et al. (US 2009/0174380) where the synthetic ripple signal, generated by a couple of transconductance amplifiers, is compared with the output of an error amplifier. This signal is then used to reset a Flip Flop (FF) and to generate the PWM signal to drive the power stage with the proper duty cycle. A clock signal is used to set the FF and to generate the minimum on-time. The power converter switches at the frequency of the clock signal.

However, the stability of this system is very difficult to study and, more importantly, to control. The gain of the system can at times be too high to guarantee a stable operation in all conditions. Another interesting prior art attempt to solve the problem is described in Lipcsei (U.S. Pat. No. 6,813,173). Lipcsei shows a hysteretic step down power converter controlled by a comparator whose inputs are the output of the power converter and a reference voltage composed of a DC part and of a ramp signal or periodic signal. The converter proposed by Lipcsei presents several drawbacks. Although the ramp signal may be at a constant frequency and although the power converter may switch at a constant frequency in Continuous Conduction Mode (CCM) in specific conditions, it does not maintain the desired switching frequency in all conditions.

Furthermore the output of the converter is subject to switching noise that could be even greater in amplitude than the superimposed voltage ripple and therefore the control of the converter may be very difficult to obtain even if the amplitude of the ramp in the reference voltage is large. Lastly the operation is not necessarily stable and, in fact Lipcsei introduces a not well defined stability circuit in the loop without teaching how that would function, but certainly the possibility for instability and sub-harmonics operation is quite high.

Another interesting prior art is described in Chen et al. (U.S. Pat. No. 7,202,642). Chen describes a hysteretic switching step down power converter where a synthetic ripple signal is summed to a reference voltage to be compared with the power converter output voltage. The ramp signal representative of the synthetic ripple signal is not a constant frequency ramp, therefore while this approach may be interesting because it may show a stable system with fast load transient response, it certainly does not teach how to obtain a high performing constant frequency switching power converter.

A further prior art is found in Stoichita (U.S. Pat. No. 7,482,793) where, a step down switching power converter with constant on-time and minimum off-time type of control is described. However, similarly to the case of Chen, this is not a constant frequency approach and in fact the major evidence of this is documented by the fact that no clock signal or oscillator is shown in the diagram or described in the specification of the patent. Although different, another example of similar prior art is found in Pullen et al. (U.S. Pat. No. 7,019,504). In this case two ramp signals are generated at both inputs of the comparator but since this is a constant on-time type of control, the switching frequency depends on the input voltage and other parameters, and it certainly does not represent a constant frequency power converter either.

Another interesting prior art is described in Groom et al. (U.S. Pat. No. 6,495,995) where a ripple multiphase step down power converter is depicted. In one of the drawings a virtual ripple signal is compared with a reference and the output of the comparator is processed by a not well defined switching control circuit. The switching frequency is not constant because a constant on-time type of approach is described. Furthermore no periodic clock signal or oscillator output is ever introduced nor described.

Finally the prior art Groom (U.S. Pat. No. 7,764,057) describes a hysteretic ramp added to the reference signal to be compared with the output voltage, but again this is not a constant frequency power converter demonstrated by the lack of clock signal or oscillator, and, in fact, the system described is a constant on-time buck converter.

All the cited prior art does not describe a constant frequency switching power converter with transient performance comparable to the one of the purely hysteretic approach and with method of controlling the system stability in all conditions. It is therefore a purpose of the present invention to describe a novel switching power converter that combines the characteristic of the hysteretic control with synthetic ripple generation but that operates at a desired constant frequency without the use of frequency control circuits, like a PLL, and with a simple and reliable means for controlling the stability of the system.

It is another purpose of the present invention to describe a power converter that can operate at constant and high switching frequency without the use of error amplifiers and compensation networks in the main loop. It is another purpose of the present invention to describe a constant frequency boost power converter that is stable and operating at high switching frequencies.

SUMMARY OF THE INVENTION

It is an objective of the present invention to provide a switching power converter that combines the main advantages of the hysteretic control with synthetic ripple signal generation with the advantages of operating at constant frequency in CCM and inherently stable in all conditions. The converter can be switched from DCM mode into CCM very quickly without affecting significantly the regulated output voltage.

It is another objective of the present invention to provide an alternative to the current use of frequency control circuits, for instance PLL (Phase Lock Loop) circuits, to synchronize the switching power converter to the desired switching frequency, therefore consuming low power thus contributing to the overall efficiency of the power converter.

It is another objective of the present invention to provide a means for operating a boost converter at very high switching frequencies while maintaining the stability of the system in all conditions. It is a further objective of the present invention to provide a means for controlling the gain of the system.

It is another objective of the present invention to provide a means for further improving the load transient response with respect to the state of the art, while maintaining control of the main parameters of the system. It is a further objective of the present invention to utilize the presented techniques for improving the performance of multiple phase switching power converters.

The present invention describes a minimum off-time type of control, where a clock signal, at the desired switching frequency, forces the inductor current charge to be turned off at every cycle for a minimum portion of the duty cycle. A comparator compares a synthetic ripple signal with a reference signal that has a DC portion and a ramp portion. The comparator defines the duty cycle and elongates the off portion of the duty cycle to the proper value to regulate the output terminal of the power converter at the desired voltage.

A feedback network, generally constituted of passive components, generates a synthetic ripple signal based on the instantaneous output voltage and on the duty cycle of the converter. However the feedback network could comprise also active components as well. A logic gate or a Flip Flop (FF) generates the drive signal from the oscillator output and from the comparator output. A FF is preferable because it guarantees one transition per cycle and a true clocked system.

The conventional minimum off-time systems can operate in a very controlled manner but suffer from possible instability for their inability to adjust the system gain. The overall gain is given by several contributions like the value of the input voltage, of the inductor, of the output capacitor, of the load and of the output voltage. The present invention introduces the use of a ramp signal of adequate amplitude in series to the DC voltage reference to adjust the overall gain. The generation of the synthetic ripple signal, depending on its own particular implementation, can also affect significantly the system gain, but the appropriate selection of the amplitude of the ramp signal guarantees the stability in all conditions.

Typically, since the period of the ramp signal is defined by the desired switching frequency, by lowering the amplitude of the ramp signal, the gain is increased, and by increasing the amplitude the gain is reduced. This mechanism resembles the slope compensation technique used in current mode controlled power converters where a ramp is summed to a current signal to obtain stability and remove possible sub-harmonic oscillations. The amplitude of the ramp signal has a relationship with the power converter's output voltage ripple, in fact generally higher switching frequencies command smaller amplitudes while lower frequencies require higher amplitude ramp signals.

The ramp signal may have several configurations. In the case of a saw tooth waveform the ramp is easily generated by the clock signal and by the charge of a small capacitor and synchronized to the signal that turns off the inductor current charge. The use of the ramp introduces a small offset in the regulated output voltage that can be easily corrected by the use of a much narrower bandwidth error amplifier.

The described system implements a minimum off-time constant frequency power converter but all the considerations are valid also for a minimum on-time type of approach where a small portion of the duty cycle, for every period, is utilized to charge the current in the inductor. A small difference between the two systems is appreciable only in the response to the transient. For instance a minimum on-time approach could be preferable in the case the emphasis is put on the response to load transient from light loads to large loads since during the recovery transition no off time is preferred.

FIG. 2 shows the block diagram of the power converter according to the preferred embodiment of the present invention for a buck converter. The oscillator 8 generates a clock signal with a very small duty cycle to generate the ramp signal 13 and to synchronize the converter with the minimum off-time. The clock signal could also be generated externally to the power converter integrated circuit to synchronize the system to any desired frequency. The ramp signal generator 13 generates the saw tooth waveform (but it could as well generate a different shape ramp signal) synchronized to the clock signal 10. The ramp signal is in series to a reference voltage 9 (typically a bandgap reference voltage or any other DC voltage).

The resulting signal 11 feeds the comparator 2 that compares it with the synthetic ripple signal 12 coming from the feedback network 6. The feedback network 6 has the task to generate a ripple signal of the right amplitude and with the right bandwidth in response to the AC and DC variations of the output voltage. In addition the synthetic ripple signal 12 may also be shaped in a particular way to improve the overall performance of the converter. The block 7 may be constituted by a simple FF or may comprise a more complex logic circuit to force the minimum off-time and allow the comparator output to determine the duty cycle of the converter. The FF can be a Set-Reset (SR) type or a D-FF type. The output Q of the FF 7 constitutes the drive signal.

As can be seen this circuit topology is quite similar to the topology of a hysteretic power converter, the main differences being the use of a ramp signal as part of the reference voltage signal and the use of a clock signal to directly force the minimum on-time or minimum off-time and therefore the switching frequency without the use of injected noise signals or PLL circuits. The synthetic ripple signal used in pseudo-hysteretic power converters can be exactly the same in this approach. The amplitude of the ramp can be adjusted based on the parameters used and the desired switching frequency or it can be made programmable or adaptive to obtain the desired compromise between stability and the best transient performance.

The described system is a clocked power converter where the clock signal determines the transition to off-time. This topology is particularly amenable for multi-phase power converter where the sequencing within the period of the various phases is extremely important to achieve the required performance. The clock signal could easily be generated from a higher frequency clock by a frequency divider so that the accurate sequencing of the minimum off-time simplifies the multi-phase synchronization. The conversion to multi-phase power conversion is much more complicated to obtain in hysteretic power converters.

The comparator 2 compares the signal 11 with the synthetic ripple 12 and when the signal 12 falls below the signal 11, the transistor M1 turns on. When the clock signal goes positive the ramp waveform is reset to zero and the transistor M1 is turned off while the transistor M2 is turned on allowing the inductor current to re-circulate. At that point the signal 12 decays and when it falls below the signal 11 the cycle repeats itself. All this sequence of events is shown in FIG. 3 where the simulated waveforms for the most significant voltages and currents of the buck power converter of FIG. 2 are reported.

The waveform 14 represents the synthetic ripple signal 12 and the waveform 15 represents the reference signal with superimposed ramp 11. The waveform 16 represents the output voltage with a small ripple depending on the various conditions of the power converter. The waveform 17 shows the inductor current and the waveform 18 represents the clock signal. In this specific case the buck voltage regulator was switched at 40 MHz, the inductor value was 200 nH, the output capacitor was 1 uF, and the load was 200 mA. In this case the power converter's control is a minimum off-time. The shown off-time is arbitrary but it could be chosen of different value without affecting significantly the outcome of the simulation.

The ramp signal can be generated in various ways. FIG. 4 depicts a possible embodiment where the ramp is generated by charging and discharging the capacitor C2 with the switch M3. M3 is driven by the clock signal generated by the oscillator 8. When the signal goes high the capacitor is discharged and the ramp is reset to zero, during the rest of the period the capacitor is allowed to charge and the ramp voltage is created. The voltage reference 9 is converted into current by the operational amplifier 19, the transistor M6 and the resistor R2. Assuming that the closed loop gain of the amplifier 19 is high enough, the voltage reference 9 is replicated as voltage drop across the resistor R2. This voltage divided by R2 generates the reference current.

If the resistor R2 is equal in value to the value of R1, and assuming the area ratio of the current mirror transistors M4 and M5 is 1, the voltage reference 9 is converted in current and summed in voltage to the ramp voltage generated at the terminals of the capacitor C2. As mentioned above the amplitude of the ramp signal is very important to define the gain, and therefore the stable operation, of the converter. The amplitude is determined by the value of C2 and R2 (R1 if different). As mentioned, the amplitude of the ramp is somewhat tied to the switching frequency value. At higher frequency the amplitude can be reduced. This is somewhat already occurring in the circuit of FIG. 4 because at higher frequency the charge time of the capacitor is proportionally reduced and, consequently so is the amplitude of the ramp signal.

However it could be advantageous to add an additional current source (not shown in FIG. 4) to modulate the charge current of the capacitor C2 in response to some parameter of the power converter so as to make it adaptive and responsive to possible lack of stability. The shown implementation is only one of many variants to achieve the desired objective as it is clear to anyone skilled in the art.

As mentioned, the addition of the ramp signal to the voltage reference and the determination of the equilibrium point during the stable operation of the converter introduces an offset in the regulated voltage of the output terminal. This voltage offset can be corrected by the introduction of an error amplifier with much lower bandwidth than the rest of the converter so as to compensate for any difference between the desired and the actual output voltage of the power converter. FIG. 5 shows how to reconfigure the operational amplifier 19 of FIG. 4 to accomplish this correction as well.

In this configuration the amplifier 19 adjusts the current into the transistor M6 and therefore the DC voltage of the node 11 to regulate the output voltage of the converter to be the same as the voltage reference 9. The entire circuit of FIG. 5 defines the block 20 that generates the reference signal based on the voltage reference 9, adds it to the ramp signal and corrects for any offset introduced. This block 20 is shown in a more general block diagram of the presented power converter topology in FIG. 6.

FIG. 6 is very similar to FIG. 2 but the block 20 adds the required offset correction as explained above. The block 20 has two inputs and one output. The inputs are the output voltage and the clock signal, while the output is the signal 11. All the considerations made above for the implementation of FIG. 2 are valid for FIG. 6. In particular, the reference signal 11, which comprises the ramp signal generated within the block 20, is compared by the comparator 2 with the synthetic ripple signal 12 to determine the duty cycle, but the clock signal 10 forces a minimum off-time of the power transistor M1 of the buck converter. Nothing substantial will change if the system would force a minimum on-time instead.

It is worth noting that although the need for an offset correction appears to be a drawback of this configuration, in practical terms also the more conventional hysteretic implementations require an error amplifier to correct the unavoidable voltage offsets introduced by the comparator. The main difference between the two cases is that while the offsets of the hysteretic approaches are not necessarily dependent on the operating conditions of the power converter, for the embodiment of FIG. 6 the offset varies with the various system conditions because the comparison operating point is a function of the load, input voltage, and output voltage.

As mentioned above the load transient response of the power converter according to the present invention is very comparable to the one obtained for the hysteretic type of control. In order to further improve the transient response of the system one could adopt a fully differential approach. It is known that when the load makes a transition from light load to heavy load, for example, the synthetic ripple signal drops very quickly in response to the drop of the output voltage. If, at the same time, the reference signal is dynamically raised, the comparator has to reflect a differential voltage that could theoretically be twice as large.

This improvement can be obtained in various ways. FIG. 7 shows an embodiment of the described technique by a simple modification of the circuit 20 of FIG. 5. By adding the capacitor C3 coupled between the output terminal of the power converter and the drain of the transistor M6, the current into the current mirror M4-M5 is increased in case of a load variation from light to heavy load. The current increase generates a proportional increase in voltage of the signal 11 effectively increasing the dynamic differential signal during the transient. Similarly the capacitor C3 could be coupled to other nodes like, for instance, the synthetic ripple signal 12 instead of the output terminal. Many other means to obtain similar results are not described here as obvious to anyone skilled in the art.

The simulated effect of the addition of the capacitor C3 into the circuit 20 is shown in FIG. 8 for the buck converter depicted in FIG. 6 during a load transient from 200 mA to 600 mA in 1 ns. The switching frequency was 40 MHz. The waveform 21 shows the inductor current for the circuit of FIG. 6 using the block 20 described in FIG. 5. The correspondent gate voltage of the high side power transistor M1 is indicated as waveform 24. The correspondent output voltage is reported in FIG. 8 as waveform 27.

The case when the block 20 of FIG. 7 is used, with the addition of the capacitor C3, was also simulated in the same exact conditions as performance comparison. The reported waveforms 22, 23, and 26 show respectively the inductor current, the gate voltage of the high side power transistor M1 and the output voltage of the power converter. It can be seen that the waveform 26 has a much smaller voltage drop than the waveform 27 due to the differential effect introduced by the capacitor C3 at the inputs of the comparator 2 during the transient.

A further improvement of the load transient performance of the power converter can be obtained by changing the control of the power converter to be closer to an hysteretic approach during dynamic conditions maintaining the same synthetic ripple signal and the same reference signal constituted of a ramp portion and of a DC portion. Basically the system described so far is a clocked system where the ramp voltage superimposed to the DC reference provides a base to control the system gain, but at every period the system is turned off or on for a small period of time.

A different variant of the presented power converter can be one where the system is not clocked anymore, but the ramp signal introduces enough ripple to the signal to make it more analogous to a noise injection system where the amplitude of the noise is large enough to synchronize the system to the desired switching frequency, but where, if the amplitude of the signal is outside the window of the injected noise, the system is not switching necessarily at the desired frequency. If the time when the system loses the frequency information in CCM is limited to the presence of a significant load or line transient, the system may be more efficient in responding to the transient conditions.

FIG. 9A describes a first possible implementation for the blocks 7 and 1 of FIG. 2 for the case of the minimum off-time system described above. In this case what has been coarsely described as a FF for the block 7 of FIG. 2, in reality it includes an inverter 30 from the output of an S-R FF as shown in the block 7A of FIG. 9A. This guarantees that the minimum off-time (or on-time) is always occurring independently from the status of the comparator, and therefore the system is invariantly clocked. FIG. 9B shows the simple but important variant for the implementation of the block 7B in which the inverter 30 has been removed and the output of the S-R FF is inverted. Although these two embodiments appear to be logically the same, there is a substantial difference between the two.

In fact, in the case of FIG. 9B the drive signal to the block 1 is changed at every period by the clock signal if, and only if, the signal from the output of the comparator is low. In the case it is high, the system is not clocked any more. This is what happens in the case of a load transient of sufficiently large amplitude. In practical terms the synchronizing signal introduced by the ramp is normally large enough to allow the system to be clocked by the clock signal and to operate as a minimum off or minimum on-time, but if the system responds to a large enough perturbation, the ramp signal does not have a large enough amplitude to allow the clocking of the power converter. This mechanism further improves the transient response; however it changes the type of control of the power converter.

FIG. 10 shows the main waveforms for the simulation of the buck power converter of FIG. 2 and FIG. 6 using the block 7A and the block 7B of FIG. 9A and FIG. 9B in the same exact conditions with a load transient from 200 mA to 1 A in 1 ns and with the switching frequency set at 40 MHz. In particular, the waveforms 32, 34 and 37, with dashed lines, represent respectively the inductor current, the high side power transistor gate voltage and the output voltage for the case of the clocked system using the embodiment of FIG. 9A. Waveforms 33, 35 and 36 represent respectively the inductor current, the high side power transistor gate voltage and the output voltage for the case of the system using the embodiment of FIG. 9B.

It can be noted that for the case of the embodiment 9B, right after the load transient, occurring at the time of 3 us, the system interrupts the clocking allowing full charge of the inductor current to react as quickly and efficiently as possible to the load abrupt change. The net effect is that the output voltage does not drop as much in correspondence of the higher load current. However these waveforms also show the fast return to the constant frequency operation not long after the system has reacted to the load change by temporarily adjusting the duty cycle. In fact, within 5 cycles from the beginning of the load transient, the two systems are re-synchronized to the desired switching frequency.

The same considerations, advantages, main blocks and system operation can be made for the case of a boost power converter. FIG. 11 shows the block diagram of the system introduced by the present invention for a boost converter. Again a feedback network 39, different in terms of implementation from the feedback network 6 described in FIG. 2 because the boost converter is inherently different from the buck converter, generates a synthetic ripple signal that gets compared with a reference signal comprising a DC portion and a ramp portion, as a periodic signal at the frequency of a clock signal generated by the oscillator 8.

The comparator output determines the duty cycle of the boost converter to maintain the output voltage regulation in all conditions and the clock signal sets the minimum off-time (or minimum on-time) of the power converter. In the embodiment of FIG. 11 the diode D1 is used but a synchronously rectified variant of the boost converter using a MOSFET switch in place of D1 would be similarly configurable as known to anyone skilled in the art without changing the main characteristics of the present invention. The feedback network 39 has one input that symbolically is coupled to the gate of the main power transistor M7 to indicate that the synthetic ripple signal has to keep into account a signal in phase to the inductor charging current.

Also in the case of the boost power converter an offset is introduced by the fact that the operating point of the signal at the inputs of the comparator vary with the overall dynamic conditions of the converter. Therefore an error amplifier should be used to correct such offset also in the case of the boost converter similarly to the case of the buck converter. All the considerations made in terms of implementing a circuit to generate the reference signal with the ramp signal superimposed to the DC voltage reference and to correct for the offset are valid in the case of the boost converter.

Similarly the considerations made to improve the load transient response are also valid for the boost converter, both in terms of generating a differential signal at the inputs of the comparator, and of modifying the system in a non-clocked power converter where the switching frequency is temporarily paused in the case of a large disturbance of the system.

FIG. 12 shows the simulated results for the more general embodiment of the boost power converter of FIG. 11 during a load transient from 100 mA to 700 mA in 1 ns with a switching frequency set at 40 MHz. The boost power converter had an input voltage of 3.5V and an output voltage regulated to be 5V. Waveform 40 represents the inductor current, waveform 41 represents the load current, the waveforms 42 and 43 represent respectively the synthetic ripple signal and the reference signal with the ramp superimposed, and waveform 44 represent the output voltage of the boost power converter. It can be observed that this is a minimum off-time system always clocked to be operating at a constant frequency of 40 MHz.

It can be noted that the system reacts quite quickly to the large load transient and that the inductor current reaches quite swiftly the desired level without any significant ringing. Also in this case the gain of the system can be adjusted by changing the slope of the ramp signal. The slow recovery of the output voltage is dependent on the implementation of the circuit to generate the synthetic ripple signal which also plays an important role in the determination of the stability of the power converter.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which:

FIG. 9A and FIG. 9B show the schematics of the blocks 7 and 1 of the embodiment of FIG. 2 according to two embodiments of the present invention.

DETAILED DESCRIPTION OF SPECIFIC EMBODIMENTS

A FIG. 2

Figure 1:
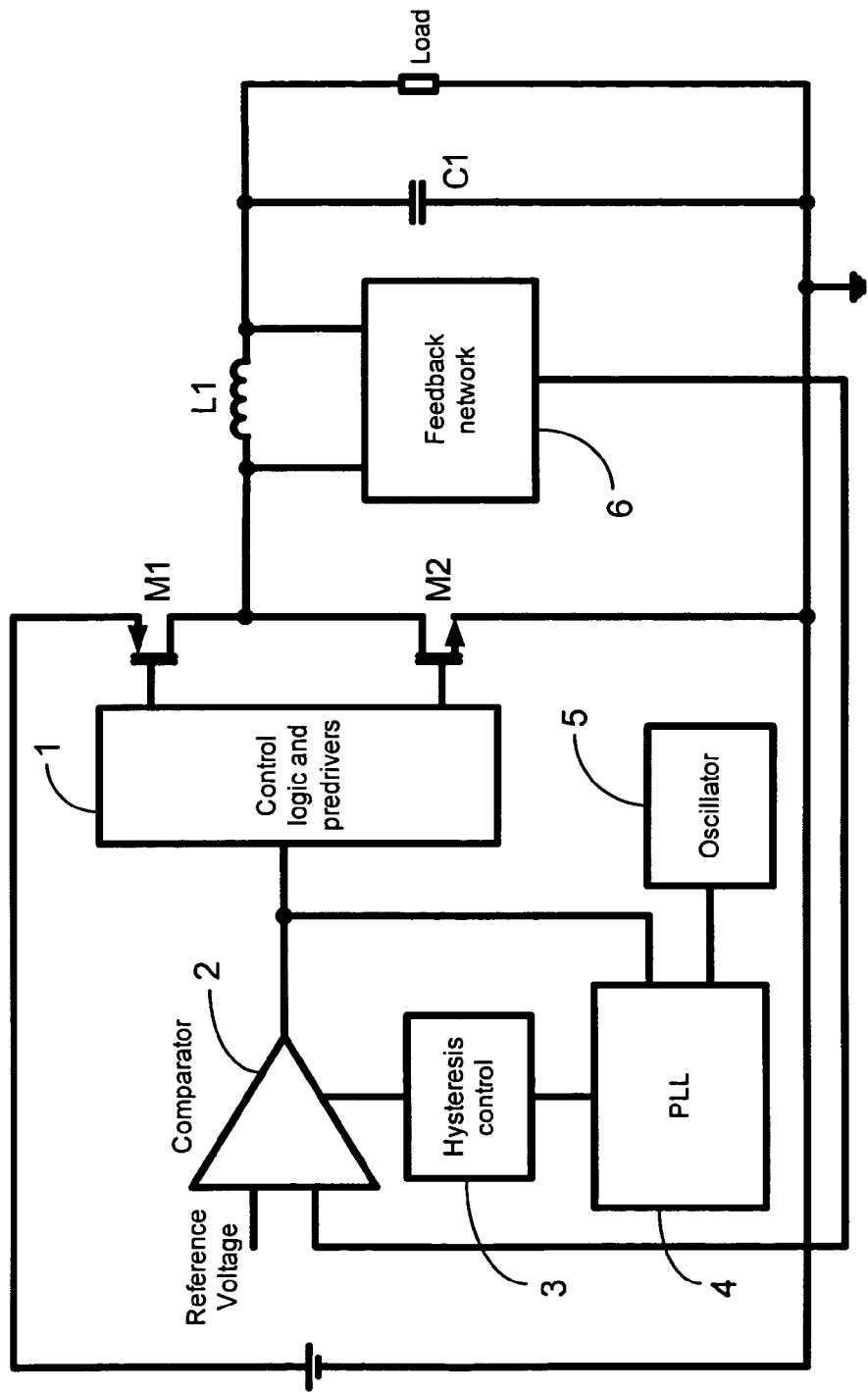
FIG. 1 shows a general hysteretic buck power converter topology with conventional switching frequency control circuit (prior art).
Figure 2:
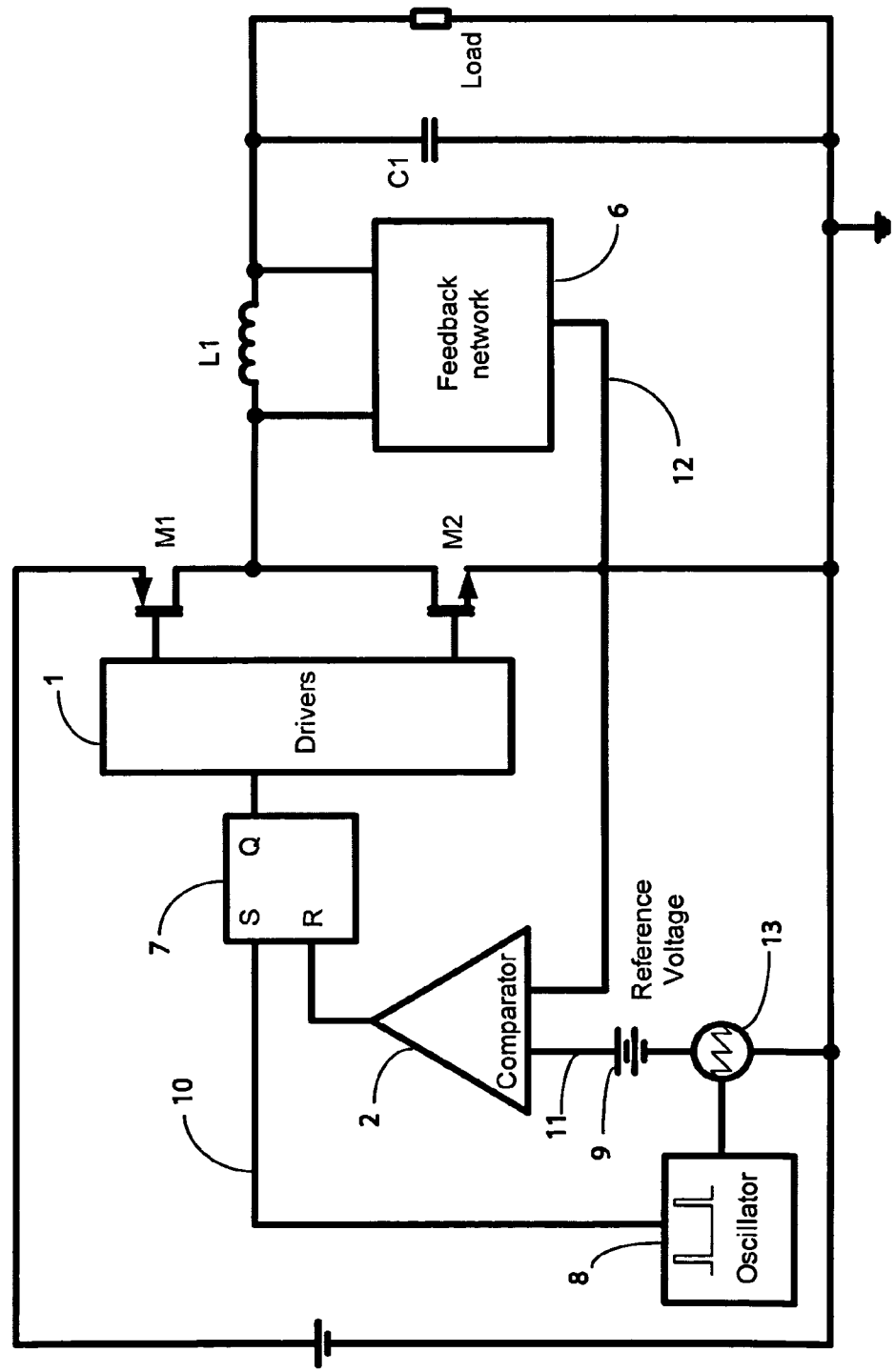
FIG. 2 shows the schematic of a buck switching power converter according to the preferred embodiment of the present invention.

FIG. 2 shows the block diagram of the power converter according to the preferred embodiment of the present invention for a buck converter. The oscillator 8 generates a clock signal with a very small duty cycle to generate the ramp signal 13 and to synchronize the converter with the minimum off-time. The clock signal could also be generated externally to the power converter integrated circuit to synchronize the system to any desired frequency. The ramp signal generator 13 generates the saw tooth waveform (but it could as well generate a different shape ramp signal) synchronized to the clock signal 10. The ramp signal is in series to a reference voltage 9 (typically a bandgap reference voltage or any other DC voltage).

The resulting signal 11 feeds the comparator 2 that compares it with the synthetic ripple signal 12 coming from the feedback network 6. The feedback network 6 has the task to generate a ripple signal of the right amplitude and of the right bandwidth in response to the AC and DC variations of the output voltage. In addition the synthetic ripple signal 12 may also be shaped in a particular way to improve the overall performance of the converter. The block 7 may be constituted by a simple FF or may comprise a more complex logic circuit to force the minimum off-time and allow the comparator output to determine the duty cycle of the converter. The FF can be a Set-Reset (SR) type or a D-FF type. The output Q of the FF 7 constitutes the drive signal.

As can be seen this circuit topology is quite similar to the topology of a hysteretic power converter, the main differences being the use of a ramp signal as part of the reference voltage signal and the use of a clock signal to directly force the minimum on-time or minimum off-time and therefore the switching frequency without the use of injected noise signals or PLL circuits. The synthetic ripple signal used in pseudo-hysteretic power converters can be exactly the same in this approach. The amplitude of the ramp can be adjusted based on the parameters used and the desired switching frequency or it can be made programmable or adaptive to obtain the desired compromise between stability and the best transient performance.

The described system is a clocked power converter where the clock signal determines the transition to off-time. This topology is particularly amenable for multi-phase power converter where the sequencing within the period of the various phases is extremely important to achieve the required performance. The clock signal could easily be generated from a higher frequency clock by a frequency divider so that the accurate sequencing of the minimum off-time simplifies the multi-phase synchronization. The conversion to multi-phase power conversion is much more complicated to obtain in hysteretic power converters.

The comparator 2 compares the signal 11 with the synthetic ripple 12 and when the signal 12 falls below the signal 11, the transistor M1 turns on. When the clock signal goes positive the ramp waveform is reset to zero and the transistor M1 is turned off while the transistor M2 is turned on allowing the inductor current to re-circulate. At that point the signal 12 decays and when it falls below the signal 11 the cycle repeats itself.

B FIG. 3.

Figure 3:
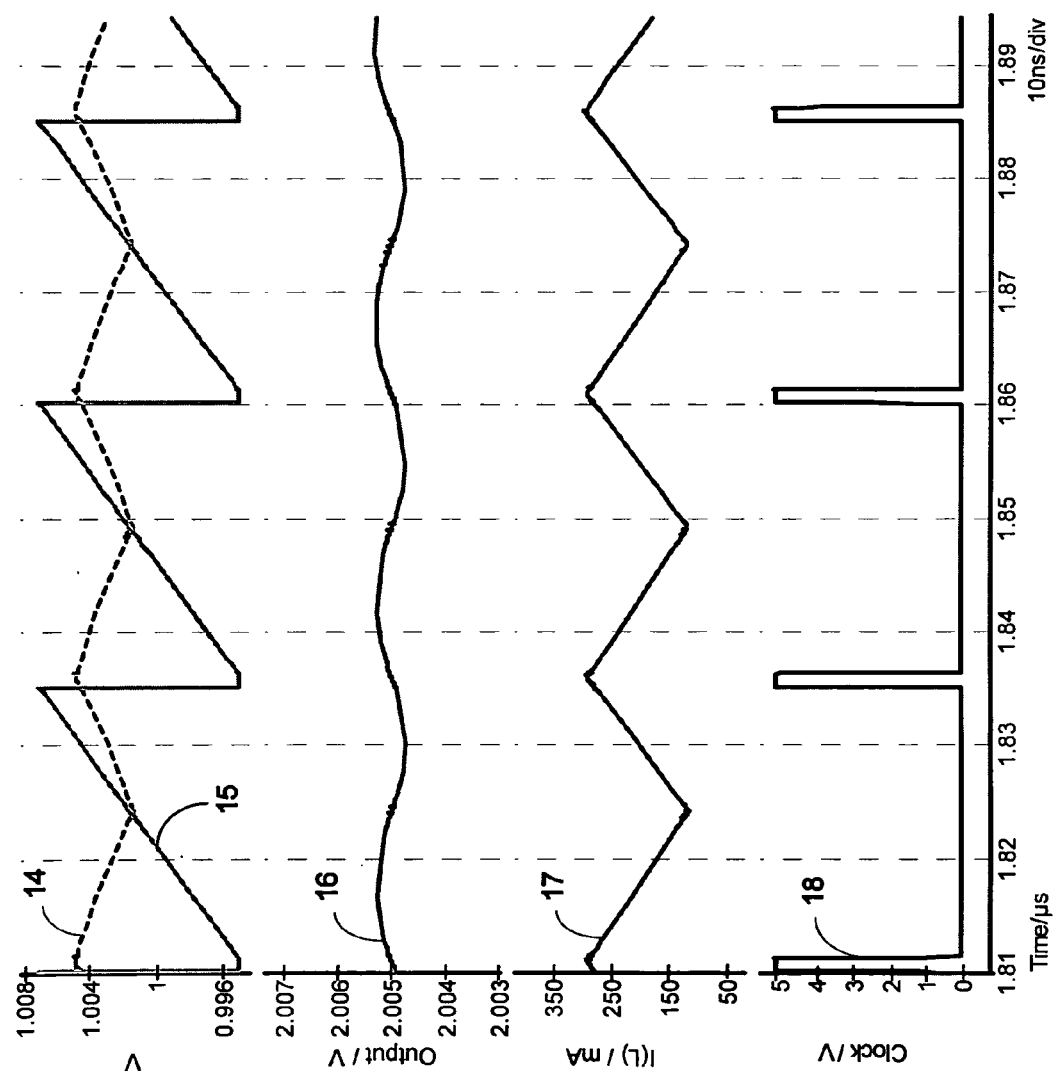
FIG. 3 shows the waveforms of the most significant voltages and currents as result of the circuit simulation of the buck converter of FIG. 2 operating in CCM.

The described sequence of events is shown in FIG. 3 where the simulated waveforms for the most significant voltages and currents of the buck power converter of FIG. 2 are reported. The waveform 14 represents the synthetic ripple signal 12 and the waveform 15 represents the reference signal with superimposed ramp 11. The waveform 16 represents the output voltage with a small ripple depending on the various conditions of the power converter. The waveform 17 shows the inductor current and the waveform 18 represents the clock signal. In this specific case the buck voltage regulator was switched at 40 MHz, the inductor value was 200 nH, the output capacitor was 1 uF, and the load was 200 mA. In this case the power converter's control is a minimum off-time and the shown off-time is arbitrary but it could be chosen of different value without affecting significantly the outcome of the simulation.

C FIG. 4

Figure 4:
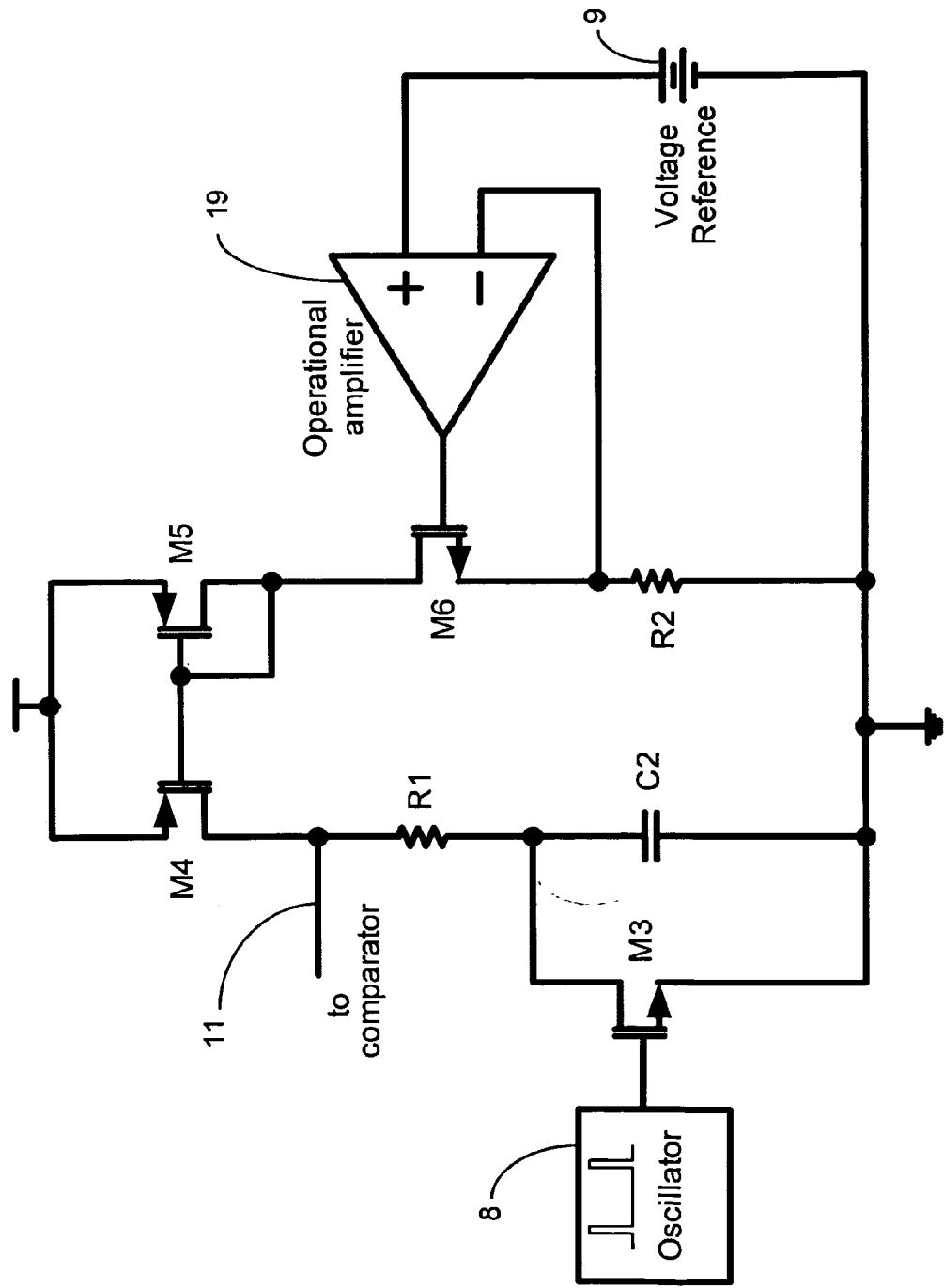
FIG. 4 shows a schematic of the reference signal generation with ramp superimposed and offset correction according to an embodiment of the present invention.

The ramp signal can be generated in various ways. FIG. 4 depicts a possible embodiment where the ramp is generated by charging and discharging the capacitor C2 with switch M3. M3 is driven by the clock signal from the oscillator 8. When the signal goes high the capacitor is discharged and the ramp is reset to zero, during the rest of the period the capacitor is allowed to charge and the ramp voltage is created. The voltage reference 9 is converted into current by the operational amplifier 19, the transistor M6 and the resistor R2. Assuming that the closed loop gain of the amplifier 19 is high enough, the voltage reference 9 is replicated as voltage drop across the resistor R2. This voltage divided by R2 generates the reference current.

If the resistor R2 is equal in value to the value of R1, and assuming the area ratio of the current mirror transistors M4 and M5 is 1, the voltage reference 9 is converted in current and summed in voltage to the ramp voltage generated at the terminals of the capacitor C2. As mentioned above the amplitude of the ramp signal is very important to define the gain, and therefore the stable operation, of the converter. The amplitude is determined by the value of C2 and R2 (R1 if different). As mentioned, the amplitude of the ramp is somewhat tied to the switching frequency value. At higher frequency the amplitude can be reduced. This is somewhat already occurring in the circuit of FIG. 4 because at higher frequency the charge time of the capacitor is proportionally reduced and, consequently so is the amplitude of the ramp signal.

However it could be advantageous to add an additional current source (not shown in FIG. 4) to modulate the charge current of the capacitor C2 in response to some parameter of the power converter so as to make it adaptive and responsive to possible lack of stability. The shown implementation is only one of many variants to achieve the desired objective as it is clear to anyone skilled in the art.

Figure 5:
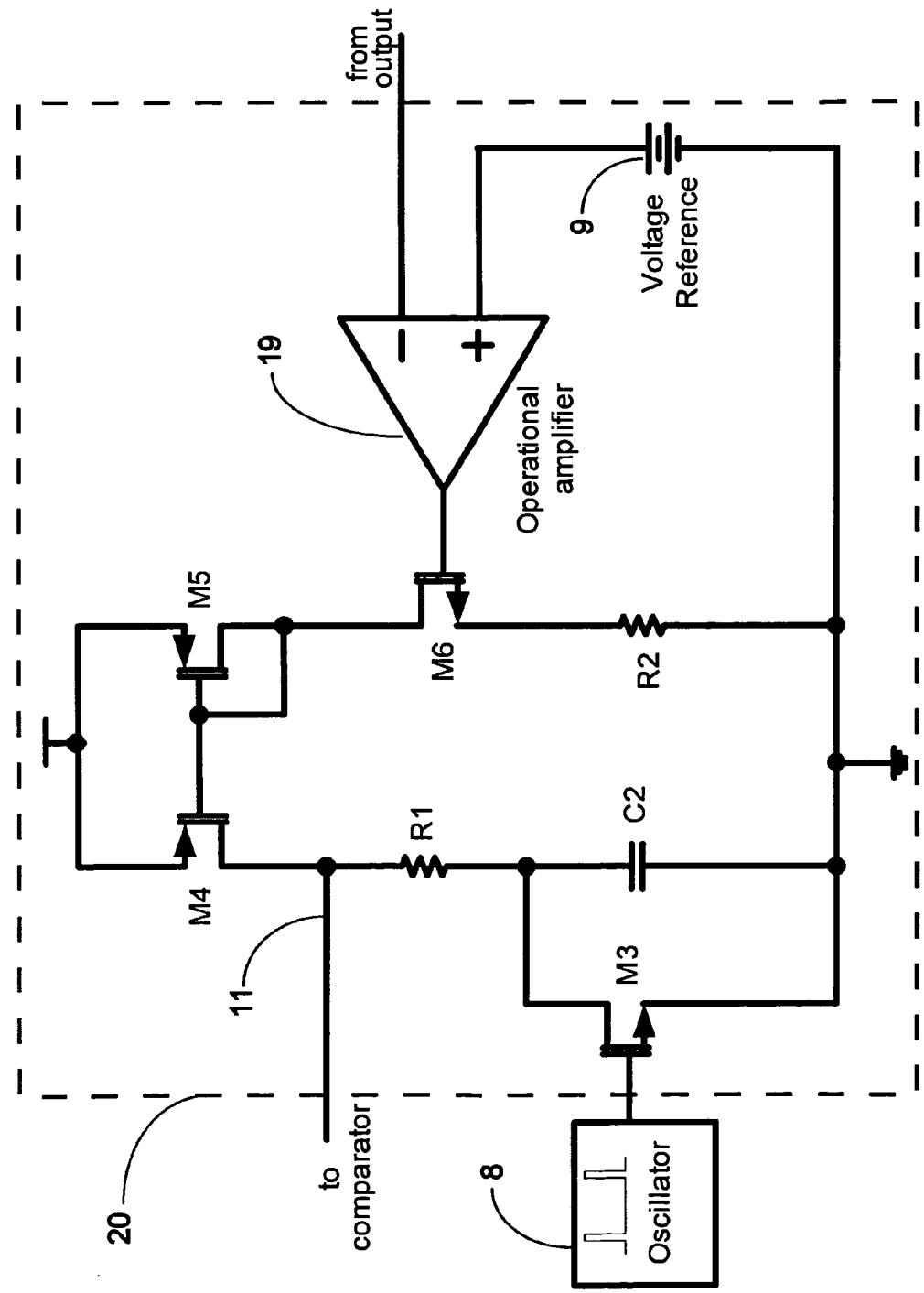
FIG. 5 shows a schematic of the reference signal generation with ramp superimposed and offset correction according to a further embodiment of the present invention.

As mentioned, the addition of the ramp signal to the voltage reference and the determination of the equilibrium point during the stable operation of the converter introduces an offset in the regulated voltage of the output terminal. This voltage offset can be corrected by the introduction of an error amplifier with much lower bandwidth than the rest of the converter so as to compensate for any difference between the desired and the actual output voltage of the power converter. FIG. 5 shows how to reconfigure the operational amplifier 19 of FIG. 4 to accomplish this correction as well.

D FIG. 5

In this configuration the amplifier 19 adjusts the current into the transistor M6 and therefore the DC voltage of the node 11 to regulate the output voltage of the converter to be the same as the voltage reference 9. The entire circuit of FIG. 5 defines the block 20 that generates the reference signal based on the voltage reference 9, adds to the ramp signal and corrects for any offset introduced. This block 20 is shown in a more general block diagram of the presented power converter topology in FIG. 6.

E FIG. 6

Figure 6:
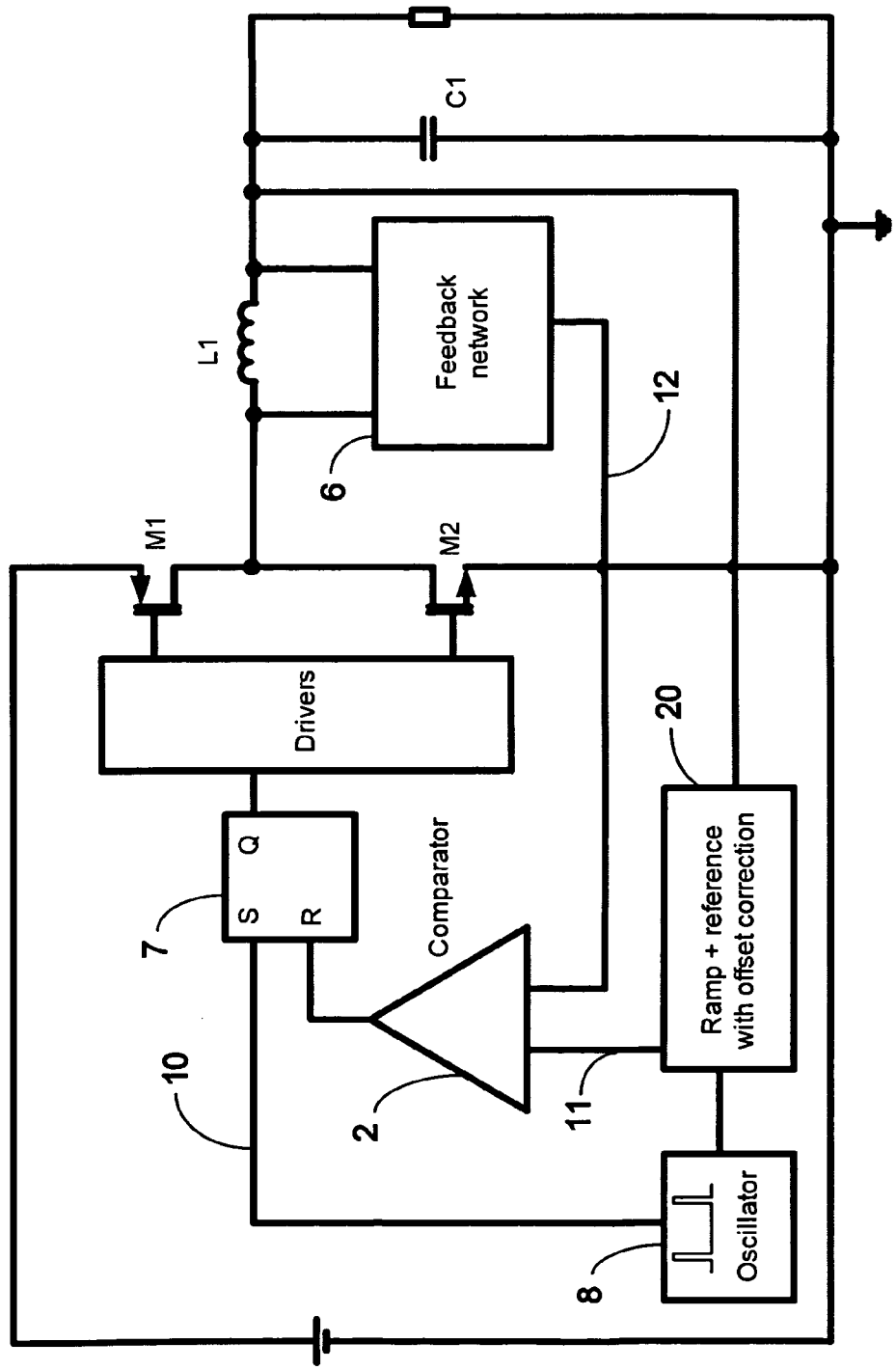
FIG. 6 shows a general schematic of the buck switching power converter according to another embodiment of the present invention with block 20 identification.

FIG. 6 is very similar to FIG. 2 but the block 20 adds the required offset correction as explained above. The block 20 has two inputs and one output. The inputs are the output voltage and the clock signal, while the output is the signal 11. All the considerations made above for the implementation of FIG. 2 are valid for FIG. 6. In particular, the reference signal 11, which comprises the ramp signal generated within the block 20, is compared by the comparator 2 with the synthetic ripple signal 12 to determine the duty cycle, but the clock signal 10 forces a minimum off-time of the power transistor M1 of the buck converter. Nothing substantial will change if the system would force a minimum on-time instead.

It is worth noting that although the need for an offset correction appears to be a drawback of this configuration, in practical terms also the more conventional hysteretic implementations require an error amplifier to correct the unavoidable voltage offsets introduced by the comparator. The main difference between the two cases is that while the offsets of the hysteretic approaches are not necessarily dependent on the operating conditions of the power converter, for the embodiment of FIG. 6 the offset varies with the various system conditions because the comparison operating point is a function of the load, input voltage, and output voltage.

As mentioned above the load transient response of the power converter according to the present invention is very comparable to the one obtained for the hysteretic type of control. In order to further improve the transient response of the system one could adopt a fully differential approach. It is known that when the load makes a transition from light load to heavy load, for example, the synthetic ripple signal drops very quickly in response to the drop of the output voltage. If, at the same time, the reference signal is dynamically raised, the comparator has to reflect a differential voltage that could theoretically be twice as large.

F FIG. 7

Figure 7:
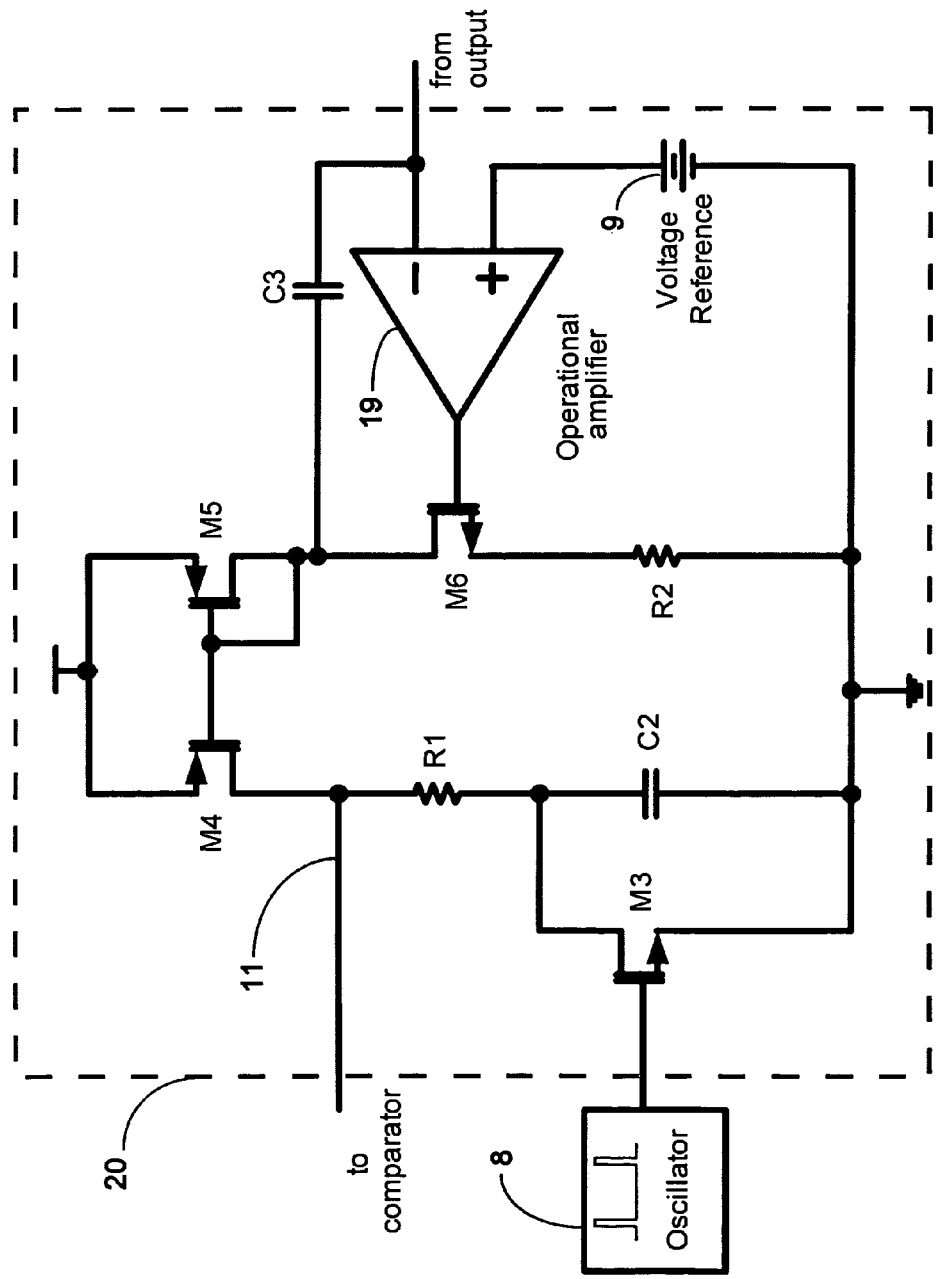
FIG. 7 shows a schematic of the reference signal generation with ramp superimposed and offset correction with added feed-forward capacitor according to another embodiment of the present invention.

This improvement can be obtained in various ways. FIG. 7 shows an embodiment of the described technique by a simple modification of the circuit 20 of FIG. 5. By adding the capacitor C3 coupled between the output terminal of the power converter and the drain of the transistor M6, the current into the current mirror M4-M5 is increased in case of a load variation from light to heavy load. The current increase generates a proportional increase in voltage of the signal 11 effectively increasing the dynamic differential signal during the transient. Similarly the capacitor C3 could be coupled to other nodes like, for instance, the synthetic ripple signal 12 instead of the output terminal. Many other means to obtain similar results are not described here as obvious to anyone skilled in the art.

G FIG. 8

Figure 8:
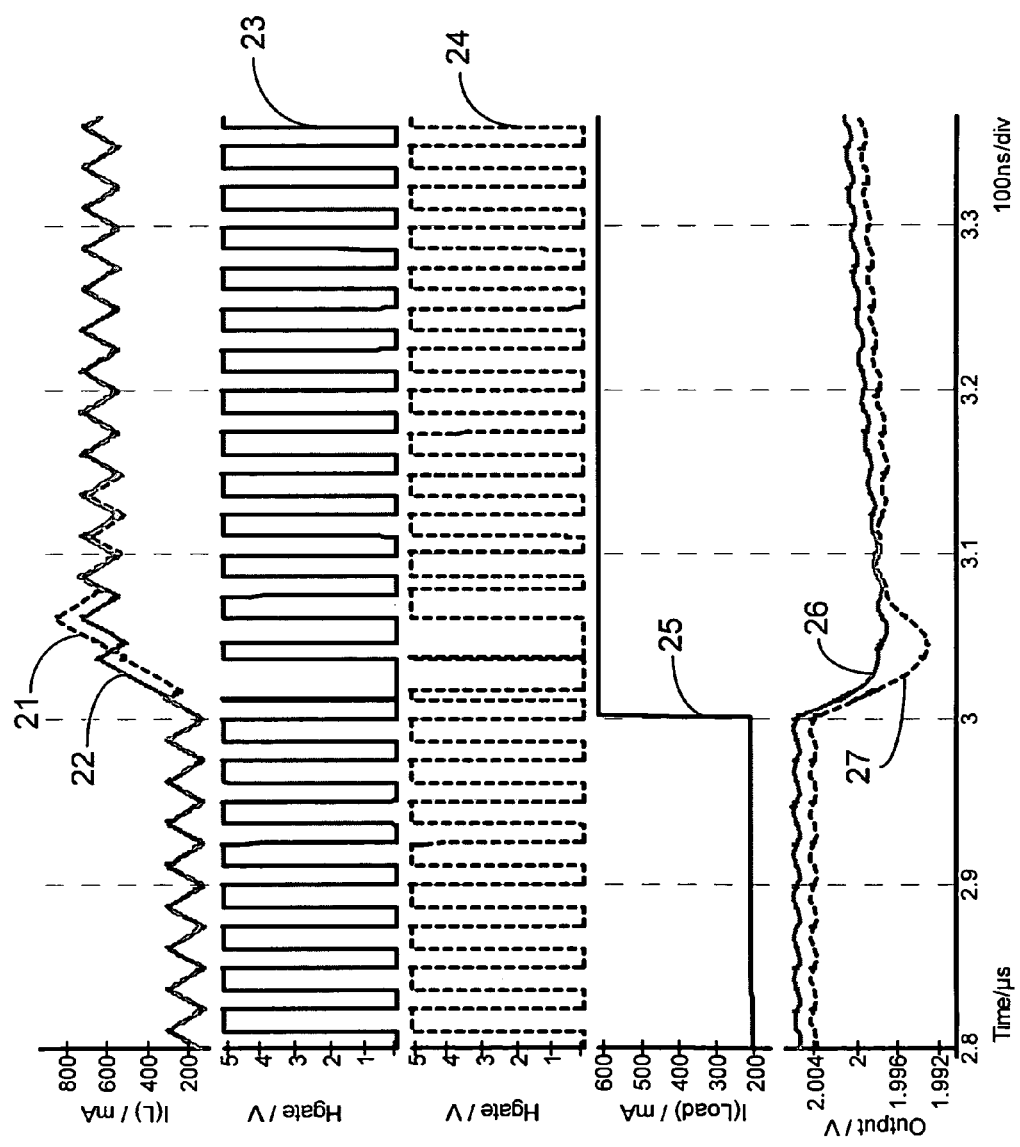
FIG. 8 shows the waveforms of the most significant voltages and currents as result of the simulation of the circuit of FIG. 6 with the embodiments of the block 20 as of FIG. 5 and FIG. 7.

The simulated effect of the addition of the capacitor C3 into the circuit 20 is shown in FIG. 8 for the buck converter depicted in FIG. 6 during a load transient from 200 mA to 600 mA in 1 ns. The switching frequency was 40 MHz. The waveform 21 shows the inductor current for the circuit of FIG. 6 using the block 20 described in FIG. 5. The correspondent gate voltage of the high side power transistor M1 is indicated as waveform 24. The correspondent output voltage is reported in FIG. 8 as waveform 27.

The case when the block 20 of FIG. 7 is used, with the addition of the capacitor C3, was also simulated in the same exact conditions as performance comparison. The reported waveforms 22, 23, and 26 show respectively the inductor current, the gate voltage of the high side power transistor M1 and the output voltage of the power converter. It can be seen that the waveform 26 has a much smaller voltage drop than the waveform 27 due to the differential effect introduced by the capacitor C3 at the inputs of the comparator 2 during the transient.

A further improvement of the load transient performance of the power converter can be obtained by changing the control of the power converter to be closer to an hysteretic approach during dynamic conditions maintaining the same synthetic ripple signal and the same reference signal constituted of a ramp portion and of a DC portion. Basically the system described so far is a clocked system where the ramp voltage superimposed to the DC reference provides a base to control the system gain, but at every period the system is turned off or on for a small period of time.

A different variant of the presented power converter can be one where the system is not clocked anymore, but the ramp signal introduces enough ripple to the signal to make it more analogous to a noise injection system where the amplitude of the noise is large enough to synchronize the system to the desired switching frequency, but where, if the amplitude of the signal is outside the window of the injected noise, the system is not switching necessarily at the desired frequency. If the time when the system loses the frequency information in CCM is limited to the presence of a significant load or line transient, the system may be more efficient in responding to the transient conditions.

H FIG. 9A and FIG. 9B

FIG. 9A describes an implementation for the blocks 7A and 1, for the case of the minimum off-time system as described above. In this case what has been coarsely described as a FF for the block 7 of FIG. 2, in reality it includes an inverter 30 from the output of an S-R FF. This guarantees that the minimum off-time (or on-time) is always occurring independently from the status of the comparator, and therefore the system is invariantly clocked. FIG. 9B shows the simple but important variant for the implementation of the block 7B in which the inverter 30 has been removed and the output of the S-R FF is inverted. Although these two embodiments appear to be logically the same, there is a substantial difference between the two.

In fact, in the case of FIG. 9B the drive signal to the block 1 is changed at every period by the clock signal if, and only if, the signal from the output of the comparator is low. In the case it is high, the system is not clocked any more. This is what happens in the case of a load transient of sufficiently large amplitude. In practical terms the synchronizing signal introduced by the ramp is normally large enough to allow the system to be clocked by the clock signal and to operate as a minimum off or minimum on-time, but if the system responds to a large enough perturbation, the ramp signal does not have a large enough amplitude to allow the clocking of the power converter. This mechanism further improves the transient response; however it changes the type of control of the power converter.

I FIG. 10

Figure 10:
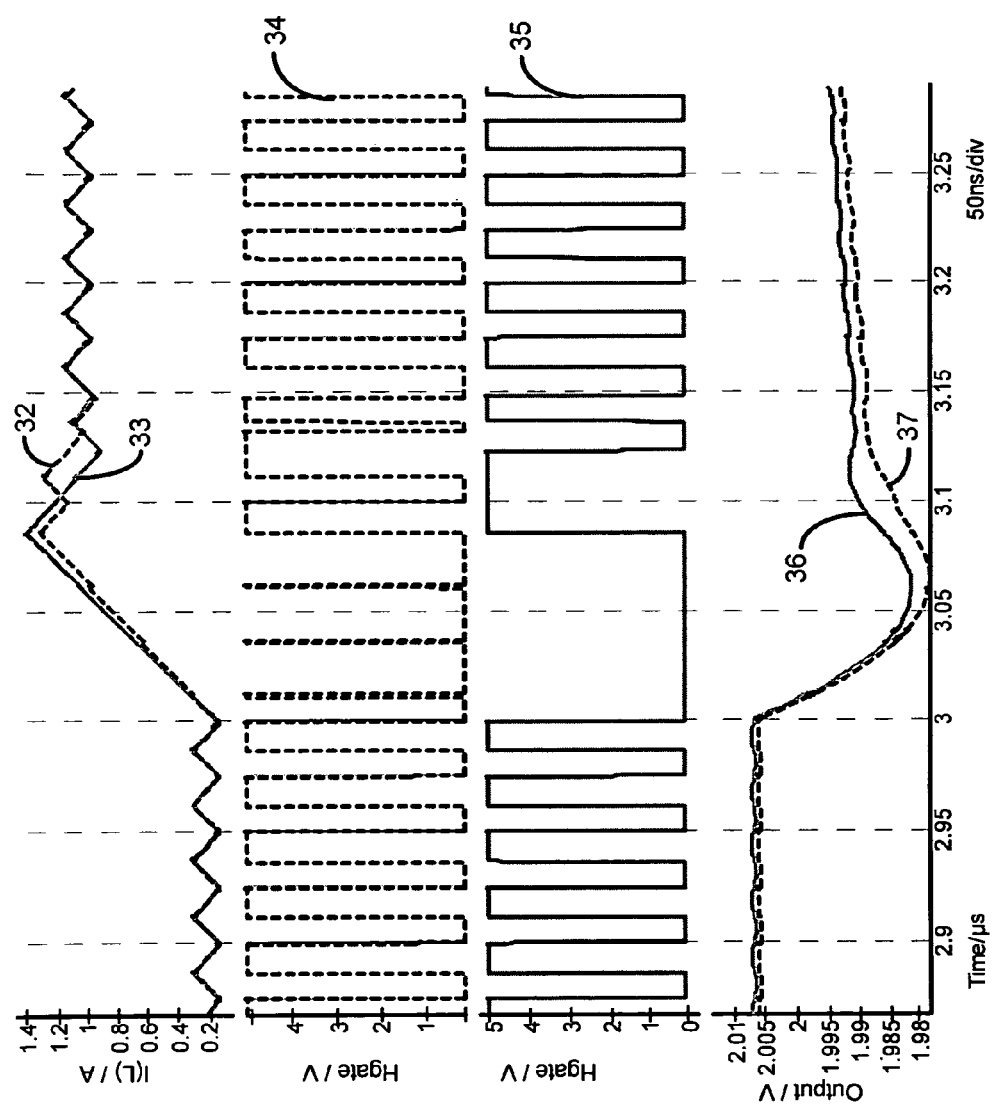
FIG. 10 shows the waveforms of the most significant voltages and currents as result of the simulation of the circuit of FIG. 6 with the circuits shown in FIG. 9A and FIG. 9B of the block 7.

FIG. 10 shows the main waveforms for the simulation of the buck power converter of FIG. 2 and FIG. 6 using the block 7A and the block 7B of FIG. 9A and FIG. 9B in the same exact conditions with a load transient from 200 mA to 1 A in 1 ns and with the switching frequency set at 40 MHz. In particular, the waveforms 32, 34 and 37, with dashed lines, represent respectively the inductor current, the high side power transistor gate voltage and the output voltage for the case of the clocked system using the embodiment of FIG. 9A. Waveforms 33, 35 and 36 represent respectively the inductor current, the high side power transistor gate voltage and the output voltage for the case of the system using the embodiment of FIG. 9B.

It can be noted that for the case of the embodiment 9B, right after the load transient, occurring at the time of 3 us, the system interrupts the clocking allowing full charge of the inductor current to react as quickly and efficiently as possible to the load abrupt change. The net effect is that the output voltage does not drop as much in correspondence of the higher load current. However these waveforms also show the fast return to the constant frequency operation not long after the system has reacted to the load change by temporarily adjusting the duty cycle. In fact, within 5 cycles from the beginning of the load transient, the two systems are re-synchronized to the desired switching frequency.

J FIG. 11

Figure 11:
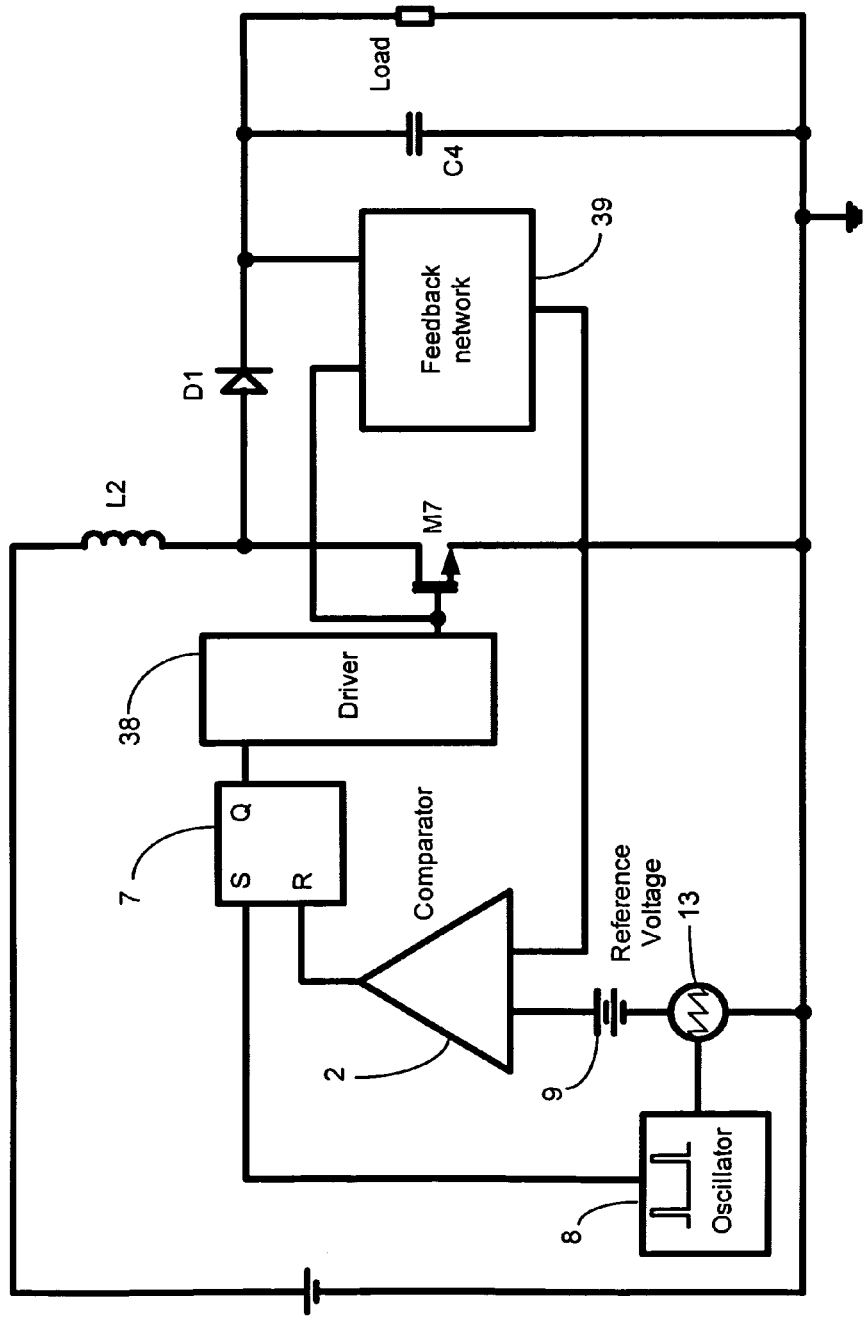
FIG. 11 shows the block diagram of a boost switching power converter according to a further embodiment of the present invention.

The same considerations, advantages, main blocks and system operation can be made for the case of a boost power converter. FIG. 11 shows the block diagram of the system introduced by the present invention for a boost converter. Again a feedback network 39, different in terms of implementation from the feedback network 6 described in FIG. 2 because the boost converter is inherently different from the buck converter, generates a synthetic ripple signal that gets compared with a reference signal comprising a DC portion and a ramp portion, as a periodic signal at the frequency of a clock signal generated by the oscillator 8.

The comparator output determines the duty cycle of the boost converter to maintain the output voltage regulation in all conditions and the clock signal sets the minimum off-time (or minimum on-time) of the power converter. In the embodiment of FIG. 11 the diode D1 is used but a synchronously rectified variant of the boost converter using a MOSFET switch in place of D1 would be similarly configurable to anyone skilled in the art without changing the main characteristics of the present invention. The feedback network 39 has one input that symbolically is coupled to the gate of the main power transistor M7 to indicate that the synthetic ripple signal has to keep into account a signal in phase to the inductor charging current.

Also in the case of the boost power converter an offset is introduced by the fact that the operating point of the signal at the inputs of the comparator vary with the overall dynamic conditions of the converter. Therefore an error amplifier should be used to correct such offset also in the case of the boost converter similarly to the case of the buck converter. All the considerations made in terms of implementing a circuit to generate the reference signal with the ramp signal superimposed to the DC voltage reference and to correct for the offset are valid in the case of the boost converter.

Similarly the considerations made to improve the load transient response are also valid for the boost converter, both in terms of generating a differential signal at the inputs of the comparator, and of modifying the system in a non-clocked power converter where the switching frequency is temporarily paused in the case of a large disturbance of the system.

K FIG. 12

Figure 12:
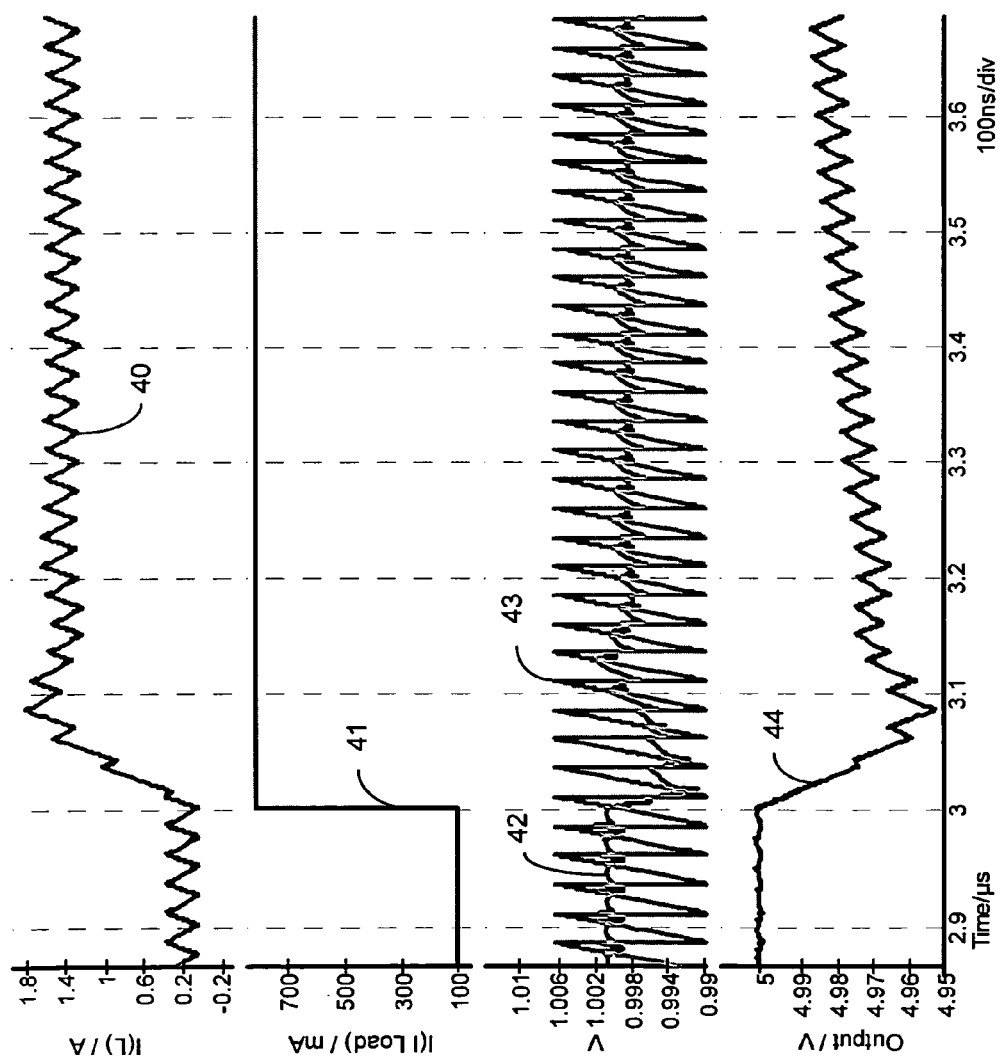
FIG. 12 shows the waveforms of the most significant voltages and currents as result of the simulation of the circuit of FIG. 11.

FIG. 12 shows the simulated results for the more general embodiment of the boost power converter of FIG. 11 during a load transient from 100 mA to 700 mA in 1 ns with a switching frequency set at 40 MHz. The boost power converter had an input voltage of 3.5V and an output voltage regulated to be 5V. Waveform 40 represents the inductor current, waveform 41 represents the load current, the waveforms 42 and 43 represent respectively the synthetic ripple signal and the reference signal with the ramp superimposed, and waveform 44 represent the output voltage of the boost power converter. It can be observed that this is a minimum off-time system always clocked to be operating at a constant frequency of 40 MHz.

It can be noted that the system reacts quite quickly to the large load transient and that the inductor current reaches quite swiftly the desired level without any significant ringing. Also in this case the gain of the system can be adjusted by changing the slope of the ramp signal. The slow recovery of the output voltage is dependent on the implementation of the circuit to generate the synthetic ripple signal which also plays an important role in the determination of the stability of the power converter.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A switching power converter, wherein a synthetic ripple signal generated by a feedback network is compared, by means of a comparator, with a reference signal;
    wherein said switching power converter operates at a switching frequency;
    wherein said synthetic ripple signal is a periodic signal, in steady state, responsive of an output voltage and of an inductor current of said switching power converter;
    wherein the frequency of said synthetic ripple signal is substantially equivalent to said switching frequency of said switching power converter;
    wherein said reference signal is a sum of a ramp periodic signal and a DC voltage;
    wherein said ramp periodic signal is generated from a clock signal at a given frequency;
    wherein said comparator determines the required duty cycle to regulate said output voltage at an output terminal of said switching power converter, and
    wherein said switching frequency of said switching power converter is substantially equivalent to said given frequency of said clock signal in continuous conduction mode.

2. The switching power converter of claim 1, wherein said switching frequency of said switching power converter is substantially constant in continuous conduction mode, and
    wherein a minimum on time of charge for said inductor current is occurring at every switching period.

3. The switching power converter of claim 1, wherein said switching frequency of said switching power converter is substantially constant in continuous conduction mode, and
    wherein a minimum off time of charge for said inductor current is occurring at every switching period.

4. The switching power converter of claim 1, wherein said clock signal is generated by an oscillator circuit.

5. The switching power converter of claim 1 further comprising an error amplifier to adjust said DC voltage of said reference signal to compensate for any offset introduced by the system, whereby said output terminal of said switching power converter is regulated to be at a desired voltage.

6. The switching power converter of claim 1, wherein said ramp periodic signal is generated by the charge and discharge of a capacitor synchronized to said clock signal, and
wherein the voltage of said ramp periodic signal is summed to said DC voltage.

7. The switching power converter of claim 1, wherein said reference signal is coupled to a signal responsive to said voltage of said output terminal of said switching power converter, and
wherein said reference signal dynamically changes in response to a load or line transient in with opposite phase with respect to a dynamic change of said synthetic ripple signal.

8. The switching power converter of claim 1, wherein said switching frequency of said switching power converter is substantially constant in continuous conduction mode in steady conditions, and
wherein said switching frequency is temporarily lowered during line and load transient to improve the transient response of said switching power converter.

9. The switching power converter of claim 1, wherein said switching power converter is a power converter belonging to the group comprising the buck, the boost and the buck-boost power converter.

10. The switching power converter of claim 1, wherein said switching power converter is a multiphase switching power converter.

11. The switching power converter of claim 1, wherein the amplitude of said ramp periodic signal is changed adaptively to maintain stability of said switching power converter and obtain optimum performance.

12. A method to convert power from a DC power source to a load comprising:
generating a synthetic ripple signal;
wherein said synthetic ripple signal is a periodic signal, in steady state, responsive of an output voltage and of an inductor current of a switching power converter;
wherein said switching power converter operates at a switching frequency;
wherein the frequency of said synthetic ripple signal is substantially equivalent to said switching frequency of said switching power converter;
generating a reference signal by summing a ramp periodic signal and a DC voltage;
wherein said ramp periodic signal is generated from a clock signal at a given frequency;
comparing said synthetic ripple signal with said reference signal by means of a comparator to determine the required duty cycle of said switching power converter to regulate said output voltage;
generating a drive signal responsive to the output of said comparator to drive an output stage of said switching power converter;
wherein said switching frequency of said switching power converter is substantially equivalent to said given frequency of said clock signal in continuous conduction mode.

13. The method of claim 12, wherein said switching frequency of said switching power converter is substantially constant in continuous conduction mode, and wherein a minimum on time of charge for said inductor current is occurring at every switching period.

14. The method of claim 12, wherein said switching frequency of said switching power converter is substantially constant in continuous conduction mode, and
wherein a minimum off time of charge for said inductor current is occurring at every switching period.

15. The method of claim 12 further comprising adjusting said DC voltage of said reference signal, by means of an error amplifier, to compensate for any offset introduced by the system, whereby said output voltage of said switching power converter is regulated to be at a desired voltage.

16. The method of claim 12, wherein said switching power converter is a power converter belonging to the group comprising the buck, the boost and the buck-boost power converter.

17. The method of claim 12, wherein said switching power converter is a multiphase switching power converter.

18. The method of claim 12, wherein the amplitude of said ramp periodic signal is changed adaptively to maintain stability of said switching power converter and to obtain optimum performance.

19. The method of claim 12, wherein said ramp periodic signal is converted into a DC voltage reference, and
wherein said switching power converter operates in pulse frequency modulation when said switching power converter operates in discontinuous conduction mode.

20. The method of claim 12, wherein said switching frequency of said switching power converter is substantially constant in continuous conduction mode in steady conditions, and
wherein said switching frequency is temporarily lowered during line and load transient to improve the transient response of said switching power converter.

* * * * *